(12) United States Patent
Larsen et al.

(10) Patent No.: US 7,985,366 B2
(45) Date of Patent: Jul. 26, 2011

(54) TRANSFERRING MATERIALS TO POLYMER SURFACES

(75) Inventors: Niels Bent Larsen, Roskilde (DK); Susan Blak Nyrup, Roskilde (DK); Henrik Pranov, Roskilde (DK)

(73) Assignee: Inmold Biosystems A/S, Taastrup (DK)

( * ) Notice: Subject to any disclaimer, the term of this patent is extended or adjusted under 35 U.S.C. 154(b) by 131 days.

(21) Appl. No.: 11/908,767

(22) PCT Filed: Mar. 15, 2006

(86) PCT No.: PCT/EP2006/060744
§ 371 (c)(1),
(2), (4) Date: May 23, 2008

(87) PCT Pub. No.: WO2006/097483
PCT Pub. Date: Sep. 21, 2006

(65) Prior Publication Data
US 2009/0224431 A1  Sep. 10, 2009

(30) Foreign Application Priority Data
Mar. 15, 2005  (GB) .................................. 0505294.9

(51) Int. Cl.
*B29C 45/00* (2006.01)
(52) U.S. Cl. .................................................. 264/328.14
(58) Field of Classification Search ............... 264/328.14
See application file for complete search history.

(56) References Cited

U.S. PATENT DOCUMENTS

| | | | | |
|---|---|---|---|---|
| 5,713,990 A | * | 2/1998 | Erhan et al. | 106/31.35 |
| 5,731,152 A | * | 3/1998 | Maracas et al. | 435/6 |
| 6,060,121 A | * | 5/2000 | Hidber et al. | 427/261 |
| 6,245,182 B1 | * | 6/2001 | Nakamura | 156/230 |
| 6,755,211 B1 | | 6/2004 | O'Connor | |
| 2002/0083686 A1 | | 7/2002 | Audino | |

(Continued)

FOREIGN PATENT DOCUMENTS

CN  1569475  * 1/2005

(Continued)

OTHER PUBLICATIONS

Dynalab material property sheet for polycarbonate.*

(Continued)

*Primary Examiner* — Joseph S Del Sole
*Assistant Examiner* — Kimberly A Stewart
(74) *Attorney, Agent, or Firm* — Pillsbury Winthrop Shaw Pittman LLP (57) ABSTRACT

A method of providing at least one heat sensitive material on at least part of a surface of a polymer article formed from a heated polymer whose temperature is sufficient to adversely affect the at least one heat sensitive material, wherein an at least partly textured shaping surface is provided. The heat sensitive material is applied to at least part of the shaping surface, the shaping surface being at a temperature at which the heat sensitive material is not adversely affected. The heated polymer is brought in contact with the shaping surface and formed by the surface shape of the shaping surface. The at least one heat sensitive material is transferred from the shaping surface to the polymer surface, while maintaining sufficiently low the temperature of the shaping surface so that the heat sensitive material is not substantially adversely affected by heat upon or after contact with the heated polymer.

12 Claims, 8 Drawing Sheets

U.S. PATENT DOCUMENTS

| | | | |
|---|---|---|---|
| 2002/0094594 A1 | 7/2002 | Kim | |
| 2002/0119251 A1 | 8/2002 | Chen | |
| 2003/0015814 A1* | 1/2003 | Krull et al. | 264/40.6 |
| 2003/0108708 A1* | 6/2003 | Anderson et al. | 428/64.4 |
| 2003/0148401 A1* | 8/2003 | Agrawal et al. | 435/7.9 |
| 2003/0213404 A1* | 11/2003 | Franks | 106/31.34 |
| 2004/0013982 A1* | 1/2004 | Jacobson et al. | 430/320 |
| 2004/0101966 A1 | 5/2004 | Davis | |
| 2004/0197595 A1* | 10/2004 | Callenbach et al. | 428/630 |
| 2006/0051549 A1* | 3/2006 | Mano | 428/40.1 |
| 2006/0102189 A1* | 5/2006 | Sirdesai et al. | 132/200 |
| 2006/0181600 A1* | 8/2006 | Bourdelais et al. | 347/199 |
| 2007/0026197 A1* | 2/2007 | Suga et al. | 428/172 |
| 2008/0029934 A1* | 2/2008 | Ziegler et al. | 264/328.14 |

FOREIGN PATENT DOCUMENTS

| | | | |
|---|---|---|---|
| EP | 983 837 | | 3/2000 |
| FR | 485 307 | | 10/1991 |
| JP | 09 267575 | | 10/1997 |
| JP | H09-267575 | * | 10/1997 |
| JP | 2000-16850 | | 1/2000 |
| WO | 98/28652 | | 7/1998 |
| WO | WO 00/20204 | * | 4/2000 |
| WO | 00/35565 | | 6/2000 |

OTHER PUBLICATIONS

European Search Reported issued in PCT/EP2006/060744 dated Jul. 27, 2006, 2 pages.

Ng et al., Microcontact printing of catalytic nanoparticles for selective electroless deposition of metals on nonplanar polymeric substrates, *Applied Physics Letters*, vol. 81, No. 16, Oct. 14, 2002, pp. 3097-3099.

Zhao et al., "Soft lithographic methods for nano-fabrication", *J. Mater. Chem.*, vol. 7, No. 7, 1997, pp. 1069-1074.

Bernard et al., "Printing Patterns of Proteins", *Langmuir, The ACS Journal of Surfaces and Colloids,*, vol. 14, No. 9, Apr. 28, 1998, pp. 2225-2229.

Kumar et al., "Features of gold having micrometer to centimeter dimensions can be formed through a combination of stamping with an elastomeric stamp and an alkanethiol 'ink' by chemical etching", *Appl. Phys. Lett*, vol. 63, No. 14, Oct. 4, 1993, pp. 2002-2004.

Pascal P. Jud, Semester Thesis—Microcontact printing of PLL-g-PEG and its derivatives, Sep. 5, 2001, 22 pages.

Ugo Mayor et al., "Letters to Nature—The Complete Folding Pathway of a Protein from Nanoseconds to Microseconds," Nature, vol. 421, Feb. 20, 2003, www.nature.com/nature, pp. 863-867.

Bradley C. Steel et al., "Nanosecond Responses of Proteins to Ultra-High Temperature Pulses," Biophysical Journal: Biophysical Letters, Jul. 6, 2006, pp. L66-L68.

David G. Pina et al., "Thermally Induced Conformational Changes in Horseradish Peroxidase," Eur. J. Biochem, vol. 268, pp. 120-126, 2001.

André Bernard et al., "Letters—Printing Patterns of Proteins," Langmuir, The ACS Journal of Surfaces and Colloids, vol. 14, No. 9, Apr. 28, 1998, pp. 2225-2229.

\* cited by examiner

TRANSFERRING MATERIALS TO POLYMER SURFACES

CROSS REFERENCE TO RELATED APPLICATIONS

This is the U.S. National Phase of PCT/EP2006/060744, filed Mar. 15, 2006, which in turn claims priority to British application no. 0505294.9, filed Mar. 15, 2005, the contents of both of which are incorporated herein in their entirety by reference.

BACKGROUND OF THE INVENTION

1. Field of the Invention

This application concerns methods for applying a material to the surface of a polymer article and to polymer articles so produced.

2. Discussion of Related Art

Typical methods used in the mass production of polymer articles are injection moulding and calendering, the latter process being frequently combined with extrusion.

Injection moulding is performed by heating a suitable polymer until molten, injecting the molten polymer into a mould, allowing the polymer to cool and harden, and removing the moulded article from the mould. This process maybe automated and therefore used to produce a rapid succession of identical articles. The mould used may have means for cooling, in order to increase the speed of hardening of the polymer. A removable shim may be incorporated into the mould, and this shim may bear surface structure and/or texture that is transferred to the polymer article during the moulding process. Alternatively, such structure may be present on the mould.

Calendering is a process used to manufacture polymer sheeting. A suitable polymer in pellet form is heated and forced through a series of heated rollers until the polymer sheet reaches the desired dimensions. The sheeting is then passed through cooling rollers in order to cool and set the polymer. Frequently, texture is applied to the polymer sheet during the process, or a strip of fabric is pressed into the back of the polymer sheet to fuse the two together.

The calendering process may be used in combination with extrusion—the extruded polymer form may be passed through the heated rollers of the calender as above until the required dimensions are obtained, and then passed over cooling rollers to set the form of the polymer.

In biotechnological applications, it is desirable to apply functional coatings to defined areas of articles for laboratory use, for example, multi-well plates, in order to reduce the likelihood of cross-contamination of samples. A method of producing such articles at low cost would be particularly desirable as many such articles must be used only once. It may be envisaged that the functional coating may be a coating to increase the affinity of defined regions of a surface for a reagent of interest, or for a biological marker or binding agent, such as an antibody or suitable fragment thereof. Alternatively, such a biological molecule may be applied directly to the polymer article as the functional coating.

Microfluidic channels, an example of a micro total analysis system, in which fluids are brought together to react and are subsequently monitored, may be mass-produced by moulding channels into a polymer surface. One method of introducing the ability to influence and monitor the state of the system is to integrate electronic circuits on the polymer surface, which may be connected to external electronics. The introduction of means for producing these integrated electronics during the process for producing the polymer channels is desirable.

BRIEF SUMMARY OF THE INVENTION

It has been discovered by the applicants that modelling the temperature of the mould in an injection moulding apparatus during injection of the molten polymer indicates that the molten polymer cools from around 300° C. to 5-10° C. above the mould temperature within 1μ of contact between the mould and the molten polymer. The possibility of applying a heat-sensitive material to the surface of a mould, or other cooled shaping surface of a polymer-forming device, and transferring that material intact to the surface of the polymer article, is therefore raised.

In certain embodiments, the invention provides a method of applying a heat-sensitive material to the surface of a polymer article manufactured from polymer heated to a sufficient temperature to destroy or at least adversely affect the heat sensitive material, whilst maintaining the integrity of the heat sensitive material.

In certain embodiments, the invention provides a method of applying a material to defined areas of a textured surface of a polymer article, which may be a mass-produced article.

Accordingly, in a first aspect, the invention provides a method of providing at least one heat sensitive material on at least part of the surface of a polymer article formed from a heated polymer whose temperature is sufficient to adversely affect the at least one heat sensitive material, wherein:
a shaping surface is provided having a smooth surface or an at least partly textured surface; the at least one heat sensitive material is applied to at least part of the shaping surface, the shaping surface being at a temperature at which the heat sensitive material is not adversely affected; the heated polymer is brought in contact with the shaping surface;
the heated polymer is formed by the surface shape of the shaping surface; and
the at least one heat sensitive material is transferred from the shaping surface to the polymer surface; and the temperature of the shaping surface is maintained sufficiently low that the at least one heat sensitive material is not substantially adversely affected by heat upon or after contact with the heated polymer.

The at least one heat sensitive material is maintained at a temperature such that it is not more than 30% degraded or denatured by contact with the heated polymer, for example not more than 20% degraded or denatured, or not more than 10% degraded or denatured. Preferably, the at least one heat sensitive material is not detectably degraded or denatured by the heated polymer. Preferably, the at least one heat sensitive material has selective binding properties. Preferably, the selective binding affinity of the at least one heat sensitive material is maintained after contact with the heated polymer.

According to a preferred practice of the invention, the polymer article is formed by injection moulding, said shaping surface forming an internal surface of the mould. Alternatively, a different shaping process is used such as compression moulding or calendering. The melting temperature for the polymers typically used in injection moulding or calendering processes is generally between 100° C. and 250° C. A suitable temperature for a melt for injection moulding may therefore be up to 300° C., for example 250° C. A suitable temperature for a melt to be formed by calendering may be up to 300° C., for example 250° C.

Preferably, cooling means cooling the shaping surface maintains the temperature of the shaping surface at or below 30° C. This may for instance be a cooling fluid passed through cooling channels in a mould or chilling a calendering roller.

The at least one heat sensitive material is preferably applied to the shaping surface by contact printing, for which one may use a smooth or at least partly textured stamp. Preferred materials for such a stamp include polydimethylsiloxane (PDMS). The stamp may have a smooth stamping surface or this may be textured with a random or systematic pattern of elevated and depressed areas. Preferably, such texture includes formations having at least one relatively small dimension, such as width. Such a dimension may for instance be less than 100 μm, more preferably less than 100 μm, more preferably less than 10 μm, e.g. less than 1 μm, possibly less than 100 μm. Such features may form lines or spots, reticulated networks, islands, islands connected by lines, or mixtures thereof. Spacing between elevated features may be less than 1 μm, more preferably less than 100 μm, more preferably less than 10 μm, e.g. less than 1 μm, possibly less than 100 μm.

Optionally, the at least one heat sensitive material is applied to the shaping surface having an at least partly textured surface such that only elevated parts of at least part of the textured surface are coated with the heat sensitive material.

A first heat sensitive material may be applied to the whole of the shaping surface. The first heat sensitive material may be applied by exposing the shaping surface to a solution of the heat sensitive material. After application of the first heat sensitive material, at least part of the first heat sensitive material may be removed from the shaping surface, suitably by contact of those parts of the first heat sensitive material with a stamp. The stamp may be similar to the stamps described herein for selective application of materials.

The shaping surface may be at least partly textured, and the at least part of the first heat sensitive material may be removed from at least some elevated parts of the textured shaping surface.

The texturing of the shaping surface may be as described above in relation to stamps. Accordingly, the surface may be textured with a random or systematic pattern of elevated and depressed areas. Preferably, such texture includes formations having at least one relatively small dimension, such as width. Such a dimension may for instance be less than 1 μm, more preferably less than 100 μm, more preferably less than 10 μm, e.g. less than 1 pm, possibly less than 100 μm. The heights of such features, which may be defined in terms of the distance between the highest and lowest point of the feature, may for instance be less than 1 gm, preferably less than 500 μm, more preferably less than 250 μm, e.g. less than 220 μm, possibly less than 100 μm. Such features may form lines or spots, reticulated networks, islands, islands connected by lines, or mixtures thereof.

At least a second heat sensitive material may be applied to at least some of the parts of the shaping surface from which the first heat sensitive material has been removed.

Methods are included wherein the shaping surface is at least partly textured, a material that modifies the hydrophilicity of the shaping surface is applied to coat elevated parts of at least some of the textured parts of the shaping surface, and a heat sensitive material is applied to at least part of the shaping surface and adheres selectively to those parts of the shaping surface having the more compatible hydrophilicity.

The at least one heat sensitive material is preferably at least one biomolecule, which may for instance be selected from the group consisting of proteins, polysaccharides, glycoproteins, proteoglycans, lipoproteins, polypeptides, polynucleotides, oligopeptides, oligonucleotides or may be an antibody or binding fragment thereof, or may be a cell adhesion promoting reagent such as polylysine.

The biomolecule may include a component of the extracellular matrix or a component of blood, interstitial fluid, or other bodily fluids of mammals, such as fibrinogen, fibrin, fibronectin, vitronectin, laminin, members of the collagen family of proteins, albumin, complement factors, or platelets.

Alternatively, the at least one biomolecule includes a component of the cell walls of mammals, plants, bacteria, or fungi, which may be selected from the group consisting of members of the integrin family, members of the lipopolysaccharide family, S. aureus Protein A and Protein G and their derivatives.

In a second aspect, the invention provides a method of providing at least one material on at least part of the surface of a polymer article formed from a heated polymer, wherein:

a shaping surface is provided which is at least partly textured;

the at least one material is selectively applied to elevated parts of the shaping surface by contact printing;

the heated polymer is brought in contact with the shaping surface;

the heated polymer is formed by the surface shape of the shaping surface; and the at least one material is transferred from the shaping surface to the surface of the polymer article whilst the shaping surface and the heated polymer are in contact.

All of the features described above in relation to the first aspect of the invention may be used in relation to this second aspect also in so far as they are not incompatible therewith. Thus, once again, injection moulding, compression moulding and calendering may be used.

The topographical replication efficacy may be modulated by choice of replication process parameters, such as by varying the speed of injection of the molten polymer into the mould, or by spatially selectively varying the heat transport properties of the shaping part surface. The microscopic topography of the shape part may be replicated with different detail from the macroscopic topography.

The at least one material may comprise a catalytically active substance, such as a palladium colloid. Catalytically active substances such as this may be suitable for electroless plating of conductive paths or islands.

Preferably, cooling means is provided. acting on the shaping surface to maintain the temperature of the shaping surface substantially below that of the polymer being shaped, e.g. at or below 100° C., e.g. at or below 30° C.

The at least one material is preferably applied to the shaping surface by contact printing as described above in. relation to the first aspect of the invention.

In preferred methods the at least one material comprises a catalytically active substance, and the method further comprises exposing the catalytically active substance on the polymer article to at least one reagent in order that the catalytically active substance catalyses a reaction. Preferably, the at least one reagent is in solution. The catalytically-active substance may be a palladium colloid.

Optionally, the solution of reagents spatially selectively deposits an insoluble product on exposure to the palladium colloid. The insoluble product may be contained within recessed surface regions of the polymer article formed by contact with the elevated parts of the shaping surface, and may be such that the insoluble product is not recessed from the surrounding surface regions of the polymer article.

The solution of reagents may comprise an inorganic complex which is catalytically decomposed to form an insoluble metal product, such as copper.

The catalytically active substance and the at least one reagent may interact to generate a controlled quantity of a product in a localized area. Such a product may be toxic, corrosive, or otherwise potentially harmful.

As in connection with the first aspect of the invention, the material applied to the polymer may be at least one biomolecule and all the above description in connection with such biomolecules applies here also. However, the at least one material may also be a molecule of non-biological origin but exhibiting biologically active properties, such as a non-biological molecule is selected from the group consisting of poly(ethylene glycols), polyacrylamides, and fluorinated polymers.

DETAILED DESCRIPTION OF EMBODIMENTS OF THE INVENTION

The invention will be described in more detail with reference to the Figures and Examples.

Figure 1:
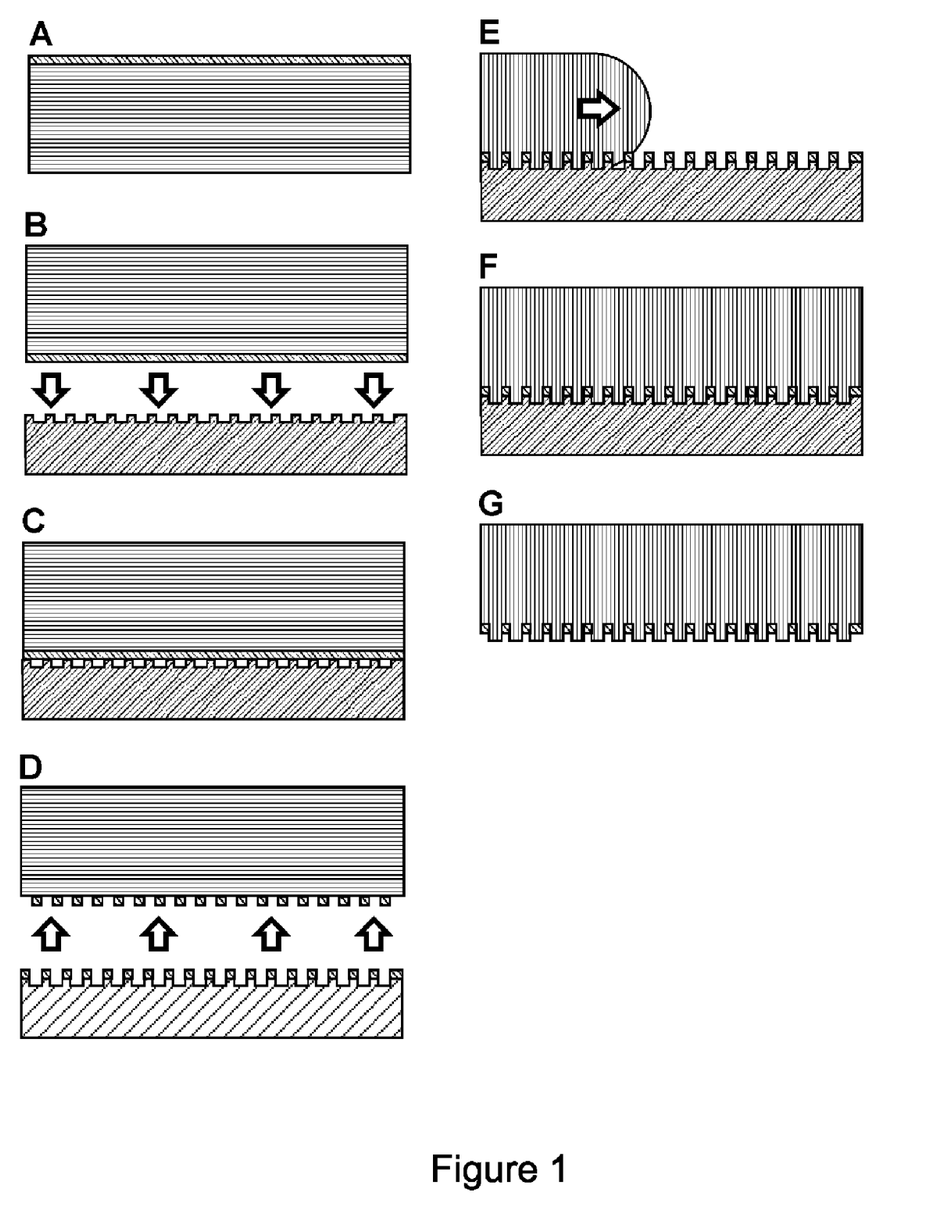
FIG. 1 is a flow chart illustrating the procedure for contact printing a shim with a desired material and transfer of the material from the shim to the polymer article during injection moulding.

The contact printing—injection moulding procedure according to an embodiment of the invention is shown schematically in FIG. 1.

A flexible stamp, made from polydimethylsiloxane (PDMS) or other suitable materials, is prepared having desired surface structure. For example, the material of the stamp may be formed around a silicon master whose surface has been patterned using UV lithography. Alternatively, an unstructured flat stamp may be formed using a convenient flat surface such as a Petri dish in place of the silicon master. After curing of the stamp in the desired form, it may be peeled from the master and cut to the required size, for example with a razor blade.

The surface of the flexible stamp may then be coated with the desired material for transfer. For structured stamps, the structured face of the stamp is immersed in a solution of the desired material; the stamp is left in the solution for a period of time sufficient for transfer of the material to the stamp, typically 10-30 min, before washing with water and drying in a stream of air. For flat stamps, a suitably-sized drop of the solution of the desired material is placed on the face of the stamp and allowed to remain there for a period of time sufficient for transfer of the material to the stamp, typically 10-30 min. The stamp is then washed and dried by adding water and spinning the stamp, for example at 2500 rpm.

The stamp is now coated with the desired transfer material, as illustrated in FIG. 1A, and is ready to be brought into contact with the shim, as in FIG. 1B.

The shim may be textured or flat, and may form a removable or a permanent part of the mould. The shim and/or the mould may additionally have macroscopic surface structure, in addition to the surface texture. For example, the shim and/or mould may be shaped to form a multi-well plate from the polymer, in which the bottoms of the wells are smooth or textured. In this example, the shaping forming the wells is the macroscopic structure, and the texture of the shim forms the texture of the bottom of the wells, and may be termed, the microscopic structure.

Figure 2:
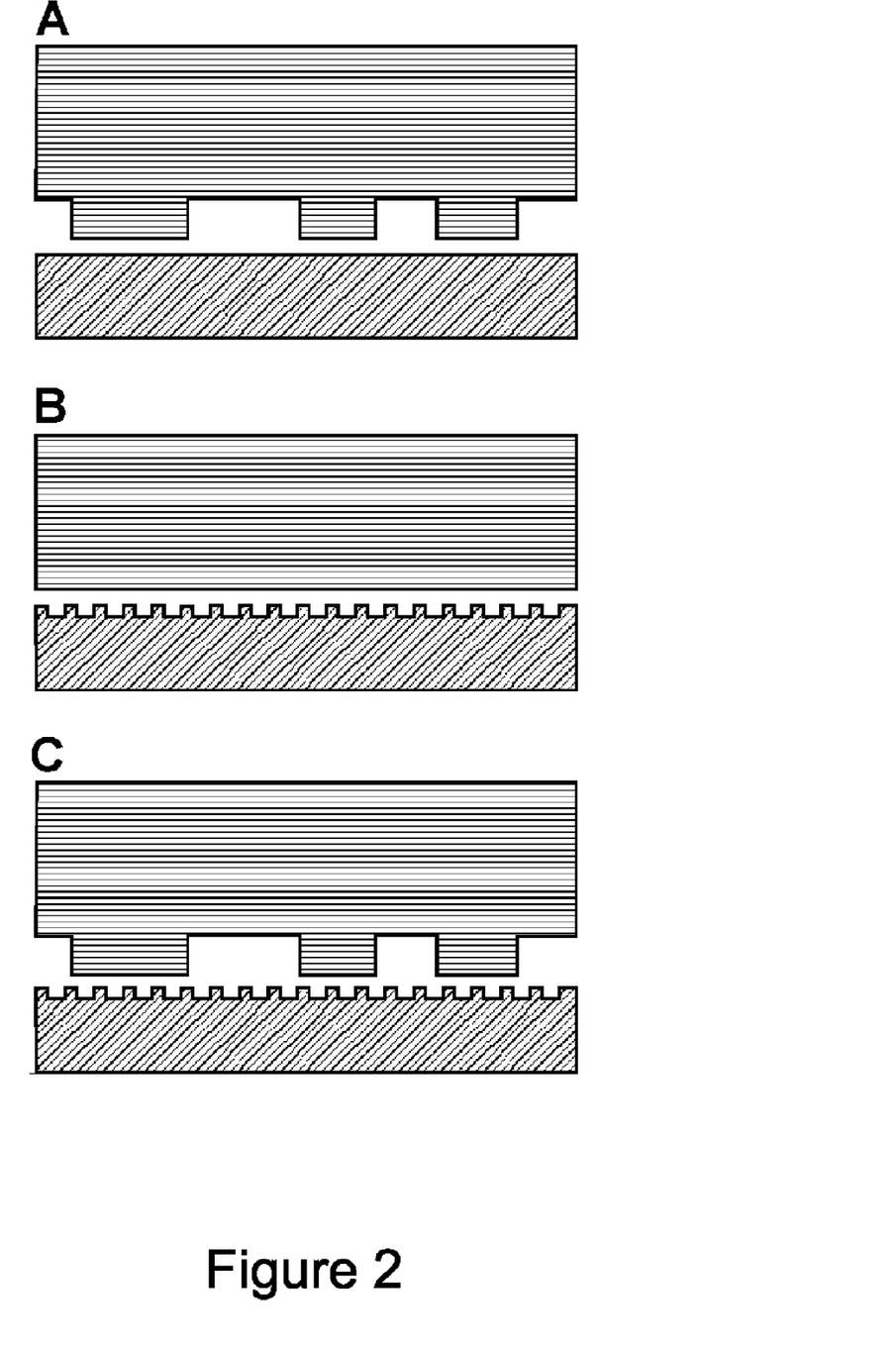
FIG. 2 is a diagram illustrating three different configurations of stamp and shim that may be used.

The face of the stamp bearing the transfer material and the shim are brought into contact for a period of time sufficient for the transfer of the material from the stamp to the shim, typically one minute. When a structured stamp is used, the material is transferred from the raised parts of the structure only. When a textured shim is used, the material is transferred only to the raised parts of the shim in contact with the stamp. This is illustrated in FIG. 1D. Examples of combinations of stamp and shim for use in the invention are illustrated in FIG. 2: FIG. 2A shows a textured stamp in combination with a flat shim, FIG. 2B shows a flat stamp in combination with a textured shim, and FIG. 2C shows a textured stamp in combination with a textured shim.

Other methods of coating the shim with the desired material may be envisaged. For example, the whole of the topography of all or part of the shim could be Coated in the material by exposing the shim to a solution, of the material for an appropriate-time period, followed by washing and drying. The recessed parts of the shim may be coated by coating the whole surface as above, followed by application of a flat adhesive surface to the shim to which the material adheres in preference to the shim. This removes the material coating the elevated parts of the shim in contact with the adhesive surface. An example of such an adhesive surface may be a PDMS stamp whose surface has been oxidized by an oxygen-containing plasma; this may be left in contact with the shim for an appropriate time period, for example 1 min. It may subsequently be desirable to coat the elevated parts of the shim with a second material, for example using a structured or flat stamp as described above. It may be envisaged that a plurality of materials may be applied to the shim in different areas and at different elevations of the surface topography by combination of these techniques.

Figure 3:
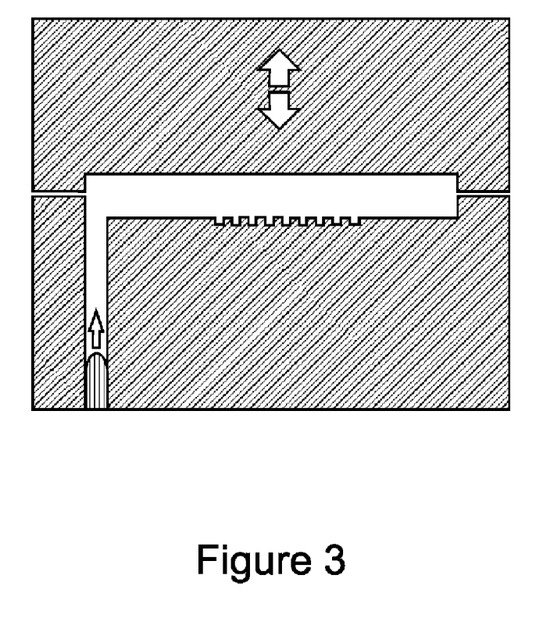
FIG. 3 is a schematic diagram of the injection moulding mould.

Once the desired combination of materials has been applied to the shim, the shim is inserted into the mould. A molten polymer is then introduced into the mould according to the usual injection moulding technique. This is shown in FIGS. 1E and 1F; a schematic diagram of the mould is shown in FIG. 3. The molten polymer adopts the form of the shim at least to an extent.

The extent to which the molten polymer adopts the form of the shim may be varied by altering the injection speed of the molten polymer into the mould. It is found that the polymer article produced using low injection speeds exhibits low or no microscopic replication of the surface texture of the shim, whilst at higher injection speeds full replication was observed. In both cases, the macroscopic replication was complete. It may be desirable to alter the microscopic replication, for example to form multi-well plates having a pattern of functional material at the bottom of each well, but no texture on the bottom surface of the well.

The molten polymer is allowed to remain in the mould until it has cooled and set. This time may be of the order of a minute or less. After setting, the materials have transferred from the shim to the surface of the polymer according to the pattern and topography with which the materials were placed on the shim. The polymer article is removed from the mould, and the materials deposited on its surface may be detected by appropriate methods.

Figure 4:
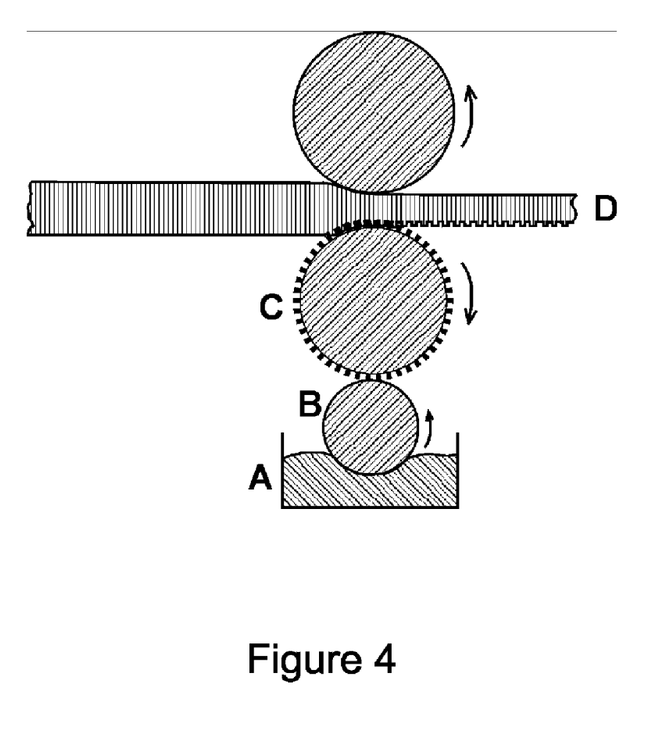
FIG. 4 shows an apparatus for applying the method of an embodiment of the invention to a calendering process.

It may also be encompassed in the present invention to use a method of forming the polymer other than injection moulding. For example, FIG. 4 shows an apparatus for incorporation into a calender, preferably between the heated rollers and the cooling rollers. The desired material may be transferred to the surface of a shaping roller by an intermediate transfer roller. The transfer roller B may be made from similar materials to those used for the flexible stamps described above, for example PDMS. Immersion of the surface of the transfer roller B in a solution of the desired material A, followed by contact between the coated surface of, the transfer roller B and the shaping roller C, transfers the material to the surface of the shaping roller. The surfaces of either or both of the shaping roller and the transfer roller may be textured, and so different patterns of the material may be obtained, as described for the injection moulding shim above.

Examples of materials for use in the invention may be biologically active molecules, of either biological or non-biological origin. As many biologically-active molecules' biological activity is destroyed by exposure to high temperatures—for example, proteins are denatured at temperatures above 40° C.—the shaping part must be maintained at a temperature of at or less than 30° C. during contact with the heated polymer. Such compounds may be used to promote or reduce cell adhesion, or may be present in wells used for a particular assay as an assay component.

Alternatively, compounds that modify the surface characteristics of the polymer may be used, such as polymer coatings that reduce or enhance the residence time of a substance on the polymer surface without reacting with that substance.

A catalytic substance may be used as the transfer material, in order to allow further functionalisation of the polymer surface in defined areas, for example electroless deposition of metals catalysed by colloidal particles of tin and/or palladium, or to allow localized production of a desired substance, for example a toxic substance.

A reactive substance may be used as the transfer material, in order to further functionalise the surface in defined areas, such as ferric tosylate deposition for use as a reducing agent to form conducting polymers.

Example 1

General Procedure for Injection Moulding

Injection moulding was performed on an Engel 25 tonnes machine fitted with a water-cooled mould with a replaceable shim. The dimensions of the shim were 39 mm×44 mm, with a 300 μm thickness. The shim was, supported by a highly heat-conducting backplate. The nickel shims used contained flat areas and 25 1 mm×1 mm areas having grids of protruding lines spaced equidistantly. The line width and line spacing were varied from 3.1 μm to 100 nm. Lines were elevated 220 nm above the base of the shim. After application of the media to be transferred; the shim was mounted in the mould and the polymer injected into the mould. The water cooling was set to the minimum temperature, yielding a mould temperature of 26° C. before injection of the molten polymer. The mould temperature was monitored via a thermistor in the backplate and increased to approximately 30° C. during injection of the molten polymer. The polymer article was removed from the mould after a cooling time of 60 s.

Example 2

General Procedure for Contact Printing of a Shim

The contact printing of a material on to the shim was carried out using flexible stamps made from polydimethylsiloxane (PDMS). Flat PDMS stamps were fabricated by casting and curing the prepolymer components of PDMS (Sylgard 184, Dow Corning, Midland, Mich.) against a Petri dish. Structured PDMS stamps were fabricated by casting and curing the prepolymer components of PDMS against a silicon master prepatterned with photoresist. The silicon master was manufactured by spin coating of a negative photoresist (SU-8, MicroChem) onto a silicon wafer followed by UV lithography. After curing, the stamps were peeled off the master and cut to the required size using a razor blade. The surface chemistry of the stamps was not modified prior to use.

The desired material was adsorbed on to the surface of the structured stamps by immersion in a solution of the required material for between 10 and 30 min. The stamps were then rinsed in Millipore water and dried in a stream of air. Flat stamps were coated by placing a 300 μm drop on the stamp for 10-30 min, followed by washing and drying by spinning off the solution at 250 rpm with the addition of 2 ml of Millipore water at the onset of spinning.

After washing and drying, the stamps were carefully placed on the nickel shims and left for 1 min before removal.

Example 3

Procedure for Coating the Entire Shaping Surface with Protein

The shape generating surface was defined on a metallic inlay of the mould cavity. The metallic inlay, made from nickel, was removed from the cavity and immersed in a solution of the material. Coating by proteins, namely fibronectin or boVine serum albumin, proceeded by immersion in a 10 μm/ml solution of the respective protein in phosphate buffered saline for 30 minutes, followed by immersion of the resulting coated surface three times in phosphate buffered saline. The final step of the procedure involved drying of the surface in an argon flow. Other experiments undertaken suggest that the incubation time of 30 min may be reduced to 1 minute with only slight reductions in the amount of protein transferred to the shape. generating surface.

Example 4

Procedure for Removing the Material Selectively from the Elevated Parts of the Shaping Surface A flat material adhesive towards the material coating the shaping surface is brought in contact with that surface and removed again to leave the elevated parts uncoated. In one example, the shaping surface was made from nickel and coated with fibronectin using immersion deposition. The flat material used was a poly(dimethylsiloxane) rubber pretreated in an oxygen plasma at 0.5 mbar for 1 min. The flat rubber material was brought in contact with the coated surface for 1 min. After peeling off the rubber material, no measurable amounts of fibronectin could be detected on the elevated areas of the shaping surface. In another example, the shaping surface was made from nickel which had been surface modified by the vapour phase of tridecafluorotetrahydrooctylthichlorosilane at 1 mbar for 1 hour before being homogeneously coated with fibronectin using immersion deposition. The flat material used for removal of protein from the elevated surface areas was untreated poly(dimethylsiloxane) rubber. The flat rubber material was left to contact the shaping surface for 1 min, and no measurable amounts of fibronectin could be detected on the elevated surface parts afterwards.

Example 5

Procedure for Applying Different Media to Different Elevations of the Shaping Surface A shaping surface, for example made from nickel, is homogeneously coated by immersion into solution of one material, for example bovine serum albumin dissolved in phosphate buffered saline. A flat material adhesive, for example poly(dimethylsiloxane) rubber oxidized in a oxygen-containing plasma, is brought in contact with the coated surface, left for 1 min, and removed. The uncoated elevated surface parts are subsequently coated by a second material using contact printing with a flat coated stamp using for example fibronectin coated on untreated poly(dimethylsiloxane).

Example 6

Procedure for Modulating the Replication Efficacy at the Microscopic Length Scale The replication efficacy was modulated by varying the injection speed of the molten polymer. A range of microscopic topographical surface patterns were employed. One of the configurations used a shaping surface consisting of 3.1 µm×3.1 µm 200 nm tall squares separated by 3.1 µm along both perpendicular surface dimensions. The shaping surface was made of nickel. In one experimental series, the polymer was Digital Versatile Disc grade polycarbonate with a glass transition temperature of 145° C. The shaping surface had a temperature of 95° C. and the polymer melt was injected into the mould cavity at a temperature of 320° C. The injection speed was varied from 0.05 m/s to 0.5 m/s. The resulting polymer replica did not exhibit measurable microscopic replication at the lowest speed, being determined as height differences of less than 1 nm between elevated and recessed areas. The replication efficacy improved gradually with increasing injection speed until fully replicated structures were found at speeds of more than 0.3 m/s. In contrast, full replication of the macroscopic shape of the mould cavity into the polymer objects was observed at all investigated injection speeds.

Example 7

Transfer of Fluorescently-Labelled IgG to PMMA

Figure 5:
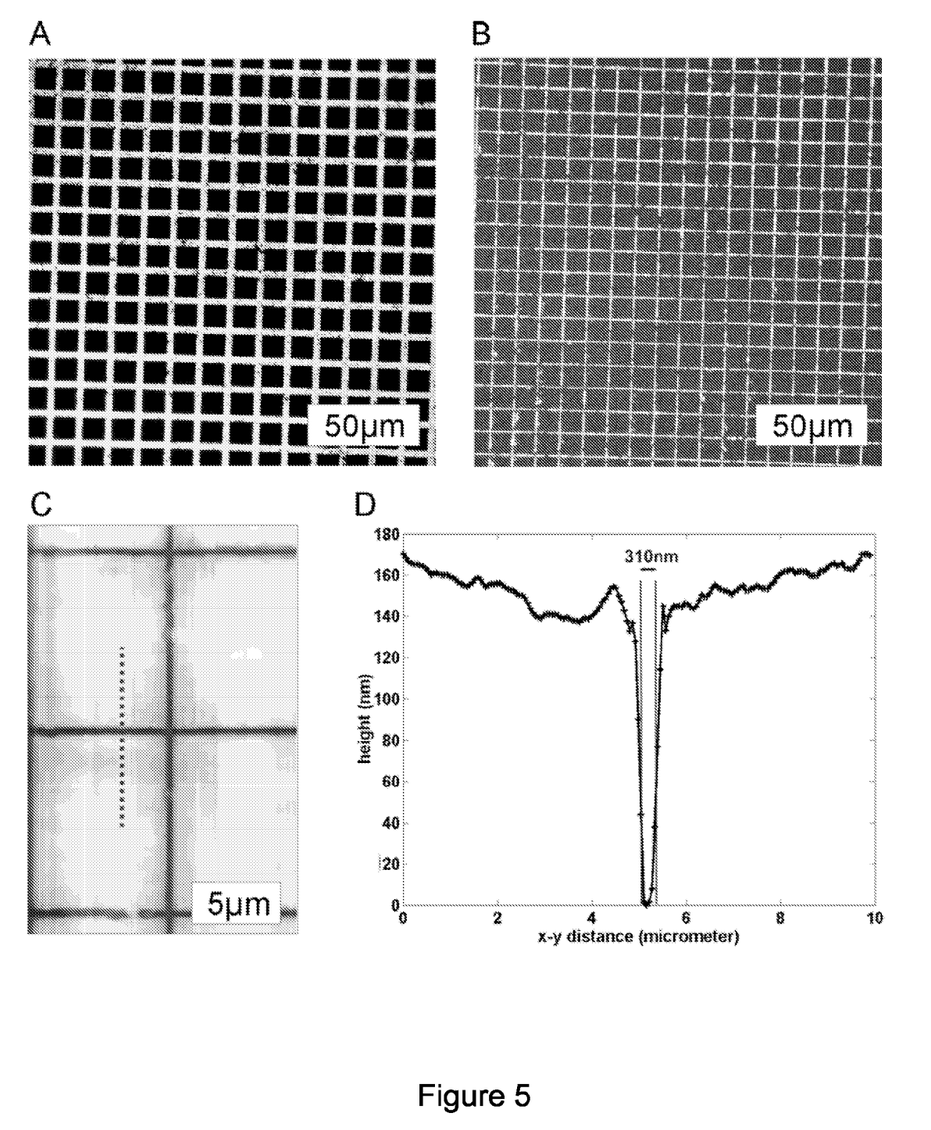
FIG. 5 shows fluorescence CLSM micrographs of Alexa 546 labelled IgG transferred to PMMA via injection moulding, and a line profile of an area: of one of the micrographs.

The transfer of fluorescently labelled IgG was carried out according to the general procedure using a flat stamp coated using a solution of 25-50 µg/ml fluorescently labelled IgG (Alexa Fluor 546 goat anti-mouse IgG (H+L), Molecular Probes, in Dulbecco's phosphate buffered saline) and a shim patterned with a grid of perpendicular lines of width 3.1 µm separated by 10 µm. Injection moulding using the shim printed with IgG was carried out according to the general procedure, with the replicas being removed from the mould after a cooling time of 60 s. Fluorescence CLSM microscopy (Zeiss LSM5 Pascal confocal laser scanning microscope, 543 nm excitation line) was used to determine the presence and position of transferred IgGs; the micrograph obtained is shown in FIG. 5a. This micrograph clearly illustrates the formation of a pattern of IgGs corresponding to the printed areas of the shim.

Example 8

Transfer of Fluorescently Labelled IgG to PMMA

Transfer was carried out as for Example 7 above except that the lines on the shim were 310 nm wide, spaced by 10 µm. The micrograph obtained is shown in FIG. 5b, an AFM image of the surface is shown in FIG. 5c, and an AFM line profile is shown in FIG. 5d. Again, it is seen that the pattern of IgGs formed on the polymer surface corresponds to that printed onto the shim.

Example 9

Transfer of Fibronectin to Polystyrene

Figure 6:
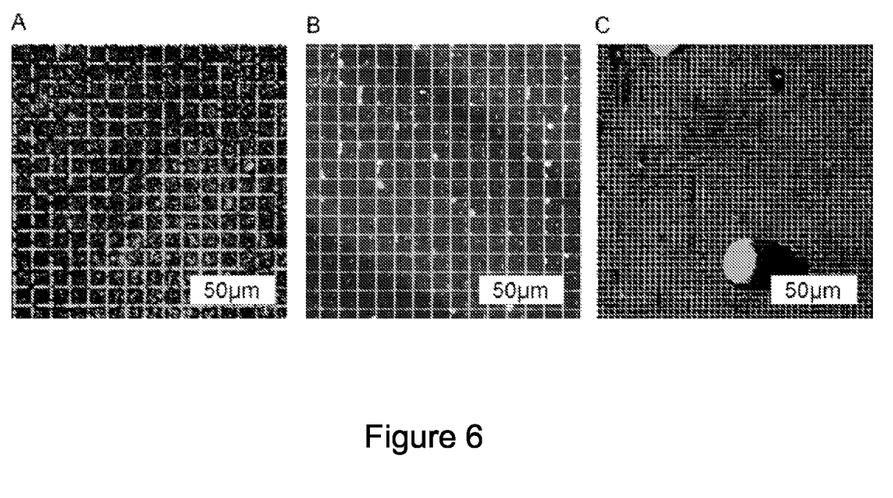
FIG. 6 shows fluorescence. CLSM micrographs of fibronectin transferred to polystyrene via injection moulding, wherein the surface of the polystyrene has been blocked with HSA, and stained with primary antibody and a fluorescently-labelled secondary antibody.

The transfer of fibronectin was carried out according to the general procedure using a flat stamp coated using a solution of 10.0 µg/ml fibronectin (from human plasma, Sigma-Aldrich, in Dulbecco's phosphate buffered saline) and a shim patterned with a grid of perpendicular lines having a width of 1 µm and a spacing of 10 pm. Injection moulding was carried out as for the general procedure, with the polymer being removed from the mould after 60 s. The polymer surface was then blocked with human serum albumin (HSA; 20 µg/ml, Sigma-Aldrich), stained with a primary antibody (25-50 µg/ml monoclonal anti-fibronectin antibody produced in mouse, Sigma-Aldrich) and then a fluorescently labelled secondary antibody (10-20 µg/ml Alexa Fluor 546 goat anti-mouse IgG (H+L), Molecular Probes). A fluorescence CLSM micrograph of the labelled transferred fibronectin is shown in FIG. 6a. This indicates that fibronectin is transferred according to the pattern printed on the shim and is able to bind the primary antibody after transfer.

Example 10

Transfer of Fibronectin to Polystyrene

Transfer, moulding and staining were carried out as for Example 9, except that the shim used was patterned with a grid of lines of width 100 nm and spacing 10 µm. The fluorescence micrograph of the polymer surface is shown in FIG. 6b. Again, the fibronectin is transferred according to the shim pattern and is able to bind the primary antibody.

Example 11

Transfer of Fibronectin to Polystyrene

Transfer, moulding and staining were carried out as for Example 9, except that the shim used was patterned with a grid of lines of width 100 nm and spacing 3.1 μm. The fluorescence micrograph is shown in FIG. 6c. Again, the fibronectin is transferred according to the pattern of the shim and is able to bind the primary antibody.

Example 12

Transfer of Fibronectin to Polycarbonate

Figure 7:
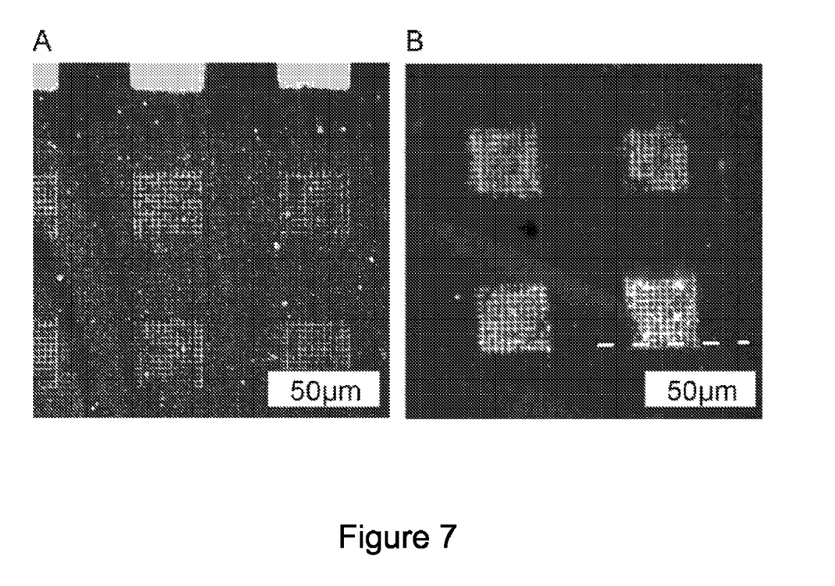
FIG. 7 shows fluorescence CLSM micrographs of fibronectin transferred to polycarbonate and polystyrene using a structured stamp in combination with a structured shim.

Transfer was carried out according to Example 9, except that the stamp was structured with protruding 40 μm squares separated by 40 μm, elevated by 16 μm relative to the base of the stamp, and the stamping was carried out partially on the patterned section of the shim and partially on the flat section of the shim. Injection moulding was carried out according to the general procedure, with the polymer being removed from the mould after a cooling time of 60 s. The polymer surface was blocked for 4 days with RSA at 4° C. according to the method of Example 9. The fibronectin was stained as in Example 9, and the fluorescent micrograph of the polymer surface is shown in FIG. 7a. Bright squares are seen where the squares of fibronectin were printed onto the flat areas of the shim; substructure of gridlines is visible where the squares of fibronectin were printed on to the patterned areas of the shim. The proteins are shown not to be mobile on the surface as the pattern is clear after 4 days in HSA. The pattern obtained also shows that the grid patterns of FIG. 6 were not obtained as a result of an artefact of the topography of the shim or polymer, such as preferred binding in the grooves.

Example 13

Transfer of Fibronectin to Polystyrene

Transfer, moulding and staining were carried out according to Example 12, except that the stamp was printed only onto the patterned regions of the shim, and the polymer surface was not blocked with HSA for 4 d before immunostaining. The fluorescence micrograph of the polymer surface is shown in FIG. 7b.

Example 14

Cell Adherence of HaCat on Polystyrene Influenced by Fibronectin

Figure 8:
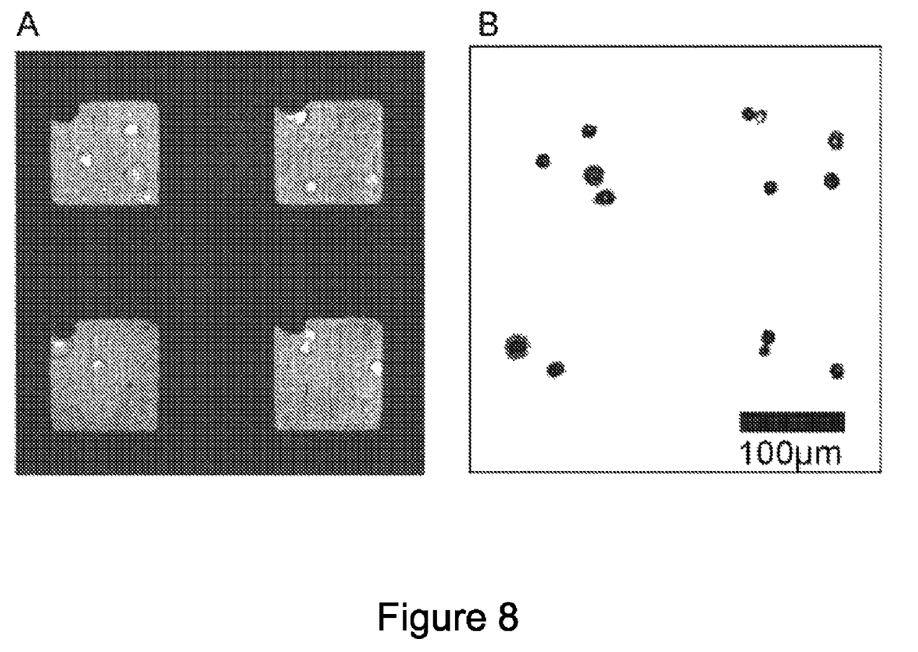
FIG. 8 shows the results of a cell adhesion experiment using a mixture of fibronectin and fluorescently-labelled protein transferred on to polystyrene.

Transfer of a 20:1 mixture of fibronectin and fluorescently-labelled IgG was carried out according to the general procedure, using a stamp structured with 100 μm squares separated by 100 μm and elevated 16 μm relative to the base of the stamp, and a flat shim. The stamp was coated in a solution of 20:1 fibronectin:IgG containing 100 μg/ml fibronectin. Injection moulding was carried out using the printed shim as in the general procedure, and the polymer replica was removed from the mould after a cooling time of 60 s. The surface of the polymer replica was then treated with HaCat cells. A fluorescence micrograph of the polymer surface after cell culturing is shown in FIG. 8a (dark areas correspond to fluorescently labelled IgG) and a reflection micrograph of the surface is shown in FIG. 8b (dark spots correspond to HaCat cells). 94% of the adhered cells were located within the protein coated areas, and so transferred fibronectin was shown to retain the ability to induce cell adhesion.

Example 15

Transfer of Pd Colloid on to Polypropylene

Figure 9:
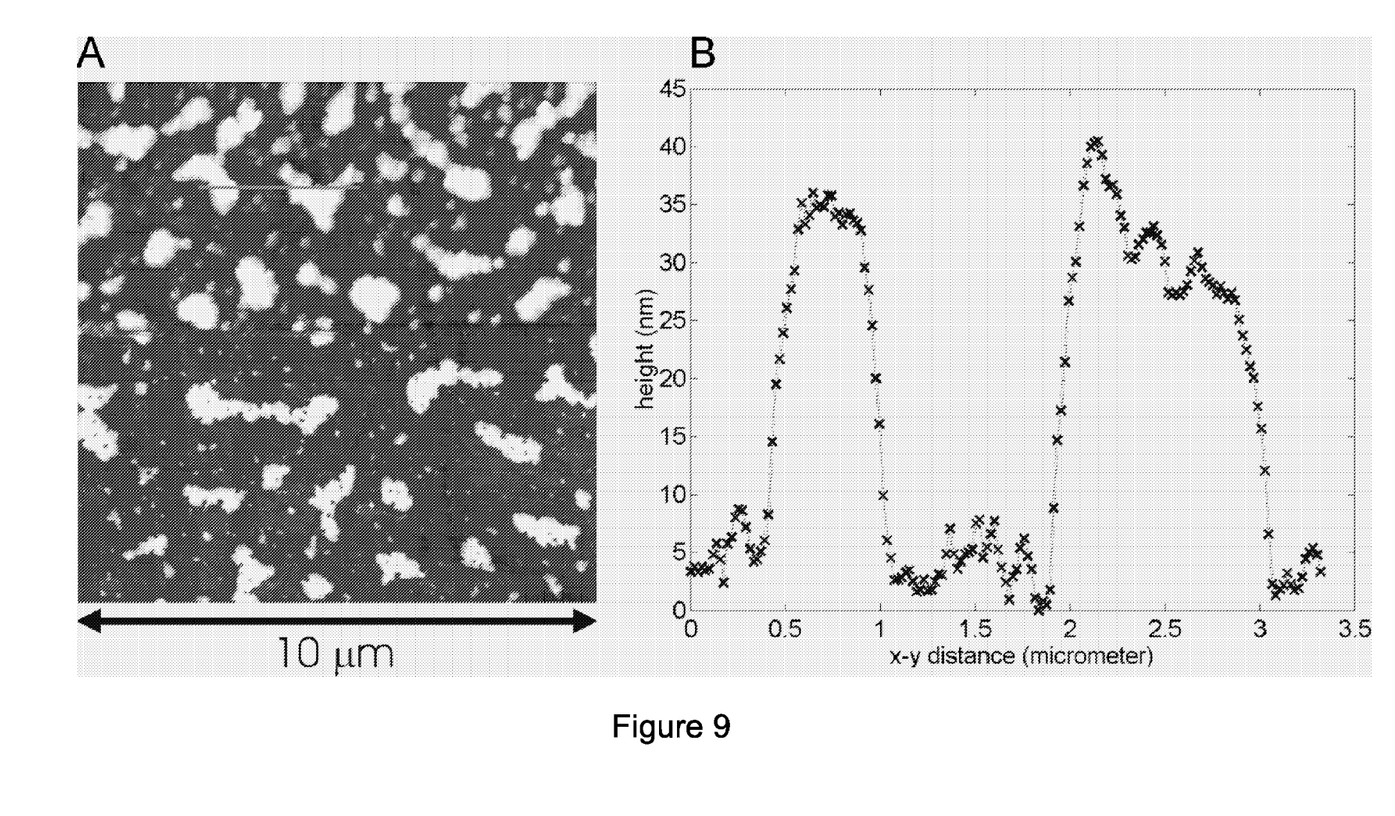
FIG. 9 shows an AFM image and a corresponding line profile of palladium colloid deposited on to a flat area of a shim.
Figure 10:
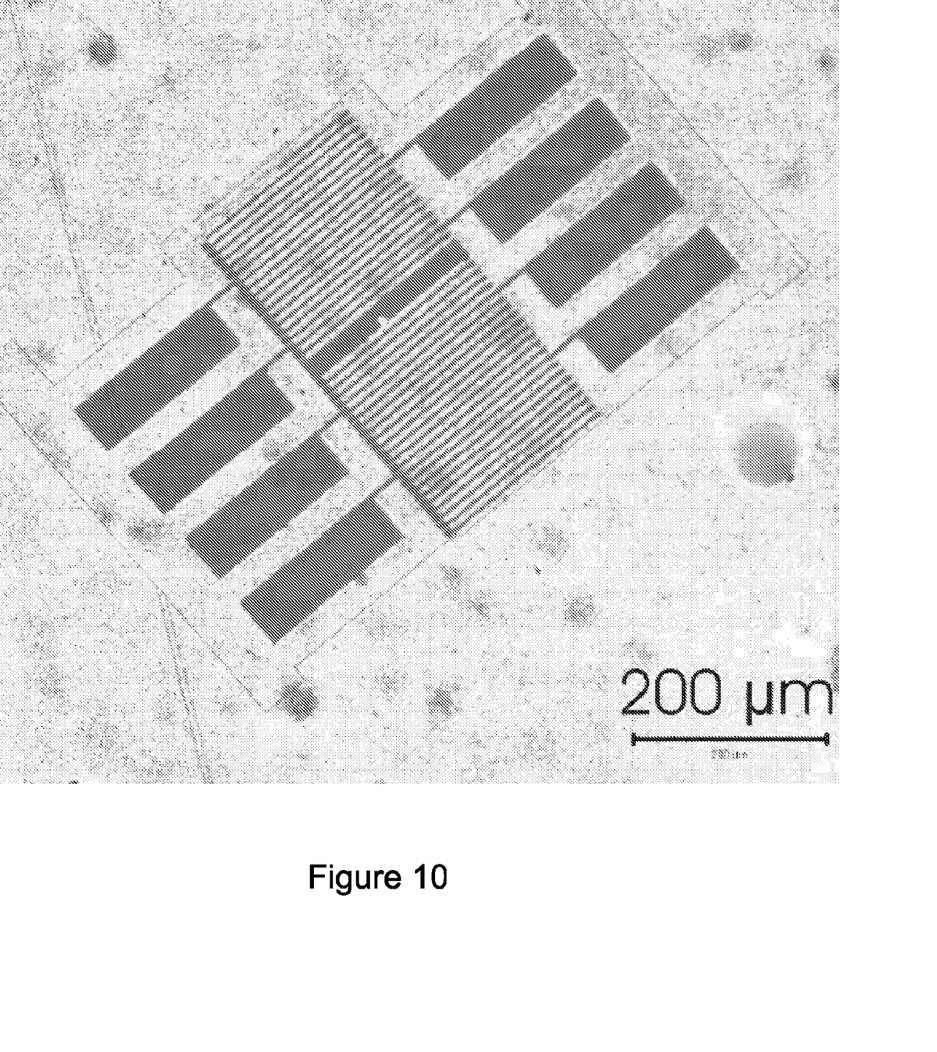
FIG. 10 shows a reflection microscopy image of a polypropylene surface to which Pd colloid has been transferred during injection moulding, and which has subsequently been copper-plated using electroless deposition.

Transfer was carried out using a flat PDMS stamp onto which was dripped a palladium colloid suspension whilst the stamp was spun at 10000 rpm. The shim was patterned with the pattern of an interdigitated array by electron beam lithography: a 300 μm thick blank nickel shim was spin coated with FOx-14 (Dow Corning), pre-exposure baked at 180° C. for 1 h, and the pattern written on using a scanning electron microscope (modified Zeiss DSM 960, 100 μC/cm$^2$) and developed. The stamp and shim were brought into contact, and an AFM image of a flat part of the shim and a corresponding line profile is shown in FIG. 9. The polypropylene melt (Inspire H-710, Dow Plastics) is injected into the mould containing the shim, and the polymeric replica released from the mould 15 s after injection. The replica is then placed in a bath of copper sulphate, Rochelle salt and water, and metallic copper is deposited from the solution on the areas of the polymer onto which the Pd colloid has been transferred. A reflection microscopy image of the replica is shown in FIG. 10, wherein the light areas are copper coated and the dark areas are uncoated polymer.

The invention claimed is:

1. A method of providing at least one protein on at least part of the surface of a polymer article formed from a heated polymer whose temperature is sufficient to denature or degrade the at least one protein by 30%, wherein:
   a shaping surface is provided having a smooth surface or an at least partly textured surface;
   the at least one protein is applied to at least part of the shaping surface, the shaping surface being at a temperature at which the at least one protein is not adversely affected;
   the heated polymer is brought in contact with the shaping surface;
   the heated polymer is formed by the surface shape of the shaping surface; and
   the at least one protein is transferred from the shaping surface to the polymer surface; and the temperature of the shaping surface is maintained sufficiently low that the at least one protein is not more than 30% degraded or denatured by contact with the heated polymer.

2. A method of providing a polymer article according to claim 1, wherein the polymer article is formed by injection moulding, said shaping surface forming an internal surface of the mould.

3. A method of providing a polymer article according to claim 1, in which cooling means cooling the shaping surface maintains the temperature of the shaping surface at or below 30° C.

4. A method of providing a polymer article according to claim 1, in which the at least one protein applied to the shaping surface is applied to the shaping surface by contact printing.

5. A method of providing a polymer article according to claim 1, wherein, after application of a first protein, at least part of the first protein is removed from the shaping surface, and at least a second protein is applied to at least some of the parts of the shaping surface from which the first protein has been removed.

6. A method of providing a polymer article according to claim 1, wherein the shaping surface is at least partly textured, a material that modified the hydrophilicity of the shaping surface is applied to coat elevated parts of at least some of the textured parts of the shaping surface, and at least one protein is applied to at least part of the shaping surface and adheres selectively to those parts of the shaping surface having the more compatible hydrophilicity.

7. A method of providing a polymer article according to claim 6, wherein the at least one protein is selected from the group consisting of glycoproteins and lipoproteins; or includes an antibody or binding fragment of an antibody; or includes a cell adhesion promoting extracellular matrix protein selected from the group consisting of fibrinogen, fibrin, fibronectin, vitronectin, laminin, members of the collagen family of proteins, albumin; or includes a ligand binding protein selected from the group consisting of Protein A and Protein G and their derivatives.

8. A method of providing a polymer article according to claim 2, wherein the topographical replication efficacy is modulated by choice of replication process parameters, selected from varying a speed of injection of the molten polymer into the mould, and spatially selectively varying the heat transport properties of the shaping part surface.

9. A method as claimed in claim 1, in which the shaping surface has at least one textured area comprising elevated or depressed regions having at least one dimension which is less than 1 mm.

10. A method as claimed in claim 9 wherein said dimension is less than 10 μm.

11. A method of providing a polymer article according to claim wherein the at least one protein is selected from the group consisting of: glycoproteins; lipoproteins; antibodies or fragments thereof; cell adhesion promoting extracellular matrix proteins selected from the group consisting of fibrinogen, fibrin, fibronectin, vitronectin, laminin, members of the collagen family of proteins, and albumin; and Protein A and Protein G and their derivatives.

12. A method of providing a polymer article according to claim 1, wherein a melting temperature of the heated polymer is in a range between about 100° C. and 300° C.

* * * * *